United States Patent
Todd

(10) Patent No.: US 11,210,713 B2
(45) Date of Patent: Dec. 28, 2021

(54) VALUE-BASED DATA REPUTATION MANAGEMENT IN DATA MARKETPLACE ENVIRONMENT

(71) Applicant: EMC IP Holding Company LLC, Hopkinton, MA (US)

(72) Inventor: Stephen J. Todd, Center Conway, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 16/356,022

(22) Filed: Mar. 18, 2019

(65) Prior Publication Data
US 2020/0302496 A1 Sep. 24, 2020

(51) Int. Cl.
*G06Q 30/02* (2012.01)
*G06F 16/38* (2019.01)

(52) U.S. Cl.
CPC ......... *G06Q 30/0283* (2013.01); *G06F 16/38* (2019.01); *G06Q 30/0203* (2013.01); *G06Q 30/0282* (2013.01)

(58) Field of Classification Search
CPC .......... G08G 1/20; G08G 1/202; G06Q 10/02; G06Q 50/30; G06Q 30/0282; G06Q 30/0203; G06F 16/38
See application file for complete search history.

(56) References Cited

U.S. PATENT DOCUMENTS

| | | | | |
|---|---|---|---|---|
| 7,827,052 B2* | 11/2010 | Scott | ................... | G06Q 10/063 705/7.11 |
| 2007/0162377 A1* | 7/2007 | Williams | ............... | G06Q 40/04 705/37 |
| 2008/0071829 A1* | 3/2008 | Monsarrat | ............ | G06F 40/169 |
| 2009/0254971 A1* | 10/2009 | Herz | .................. | G06Q 30/0603 726/1 |
| 2010/0287030 A1* | 11/2010 | Sinha | ................. | G06Q 30/0609 705/26.5 |
| 2011/0196776 A1* | 8/2011 | Rash | ...................... | G06Q 40/04 705/37 |
| 2011/0295722 A1* | 12/2011 | Reisman | ............ | G06Q 30/0641 705/27.1 |

(Continued)

OTHER PUBLICATIONS

Kelley Blue Book Highlights Labor Day Weekend New-car Deals, Aug. 28, 2013, Digital Dealer (https://www.digitaldealer.com/dealer-gm/kelley-blue-book-highlights-labor-day-weekend-new-car-deals/, p. 2. (Year: 2013).*

(Continued)

*Primary Examiner* — Jeff Zimmerman
*Assistant Examiner* — Duane N. Moore
(74) *Attorney, Agent, or Firm* — Ryan, Mason & Lewis, LLP

(57) ABSTRACT

Techniques for value-based data reputation management in a data marketplace environment are provided. For example, a method comprises the following steps. In a data marketplace environment with at least one data producer and at least one data consumer, an electronic data storage area is established, by one of the data producer and the data consumer, for receiving and storing feedback data from the other of the data producer and the data consumer. The feedback data relates to a transaction between the data producer and the data consumer with respect to a given data set.

20 Claims, 9 Drawing Sheets

(56) References Cited

U.S. PATENT DOCUMENTS

| | | | | |
|---|---|---|---|---|
| 2012/0116911 | A1* | 5/2012 | Irving | G06Q 30/0611 |
| | | | | 705/26.4 |
| 2012/0173355 | A1* | 7/2012 | Smith | G06Q 30/0201 |
| | | | | 705/26.1 |
| 2012/0246182 | A1* | 9/2012 | Stephens, Jr. | G06F 16/288 |
| | | | | 707/758 |
| 2013/0080348 | A1* | 3/2013 | Pantaliano | H04H 60/66 |
| | | | | 705/347 |
| 2013/0151423 | A1* | 6/2013 | Schmidt | G06F 16/215 |
| | | | | 705/306 |
| 2013/0304573 | A1* | 11/2013 | Pinhas | G06Q 30/0282 |
| | | | | 705/14.53 |
| 2014/0279653 | A1* | 9/2014 | Dias | G06Q 10/0833 |
| | | | | 705/333 |
| 2014/0289160 | A1* | 9/2014 | Stovall | G06Q 30/0282 |
| | | | | 705/347 |
| 2015/0199740 | A1* | 7/2015 | Abuelsaad | G06Q 30/0623 |
| | | | | 705/26.61 |
| 2015/0356644 | A1* | 12/2015 | Diana | H04W 4/02 |
| | | | | 705/347 |
| 2017/0068974 | A1* | 3/2017 | Firestone | G06Q 30/0203 |
| 2017/0186055 | A1* | 6/2017 | Silkey | G06Q 30/0278 |
| 2017/0344934 | A1* | 11/2017 | Millhouse | G06Q 50/30 |
| 2018/0096365 | A1* | 4/2018 | Noyes | G06Q 30/08 |

OTHER PUBLICATIONS

Kelley Blue Book Highlights Labor Day Weekend New-car Deals, Aug. 28, 2013, Digital Dealer (https://www.digitaldealer.com/dealer-gm/kelley-blue-book-highlights-labor-day-weekend-new-car-deals/, p. 2. (Year: 2013) (Year: 2013).*

M. Ali et al., "Blockstack: A Global Naming and Storage System Secured by Blockchains," USENIX Annual Technical Conference (USENIX ATC), Jun. 22-24, 2016, pp. 181-194.

U.S. Appl. No. 15/135,817 filed in the name of Stephen Todd et al. on Apr. 22, 2016 and entitled "Data Value Structures."

U.S. Appl. No. 16/263,065 filed in the name of Stephen Todd on Jan. 31, 2019 and entitled "Proof-Of-Value Provenance for Data Marketplace Environment."

U.S. Appl. No. 16/260,999 filed in the name of Stephen J. Todd on Jan. 29, 2019, and entitled "Leveraging Data in Data Marketplace Environment."

* cited by examiner

100

200

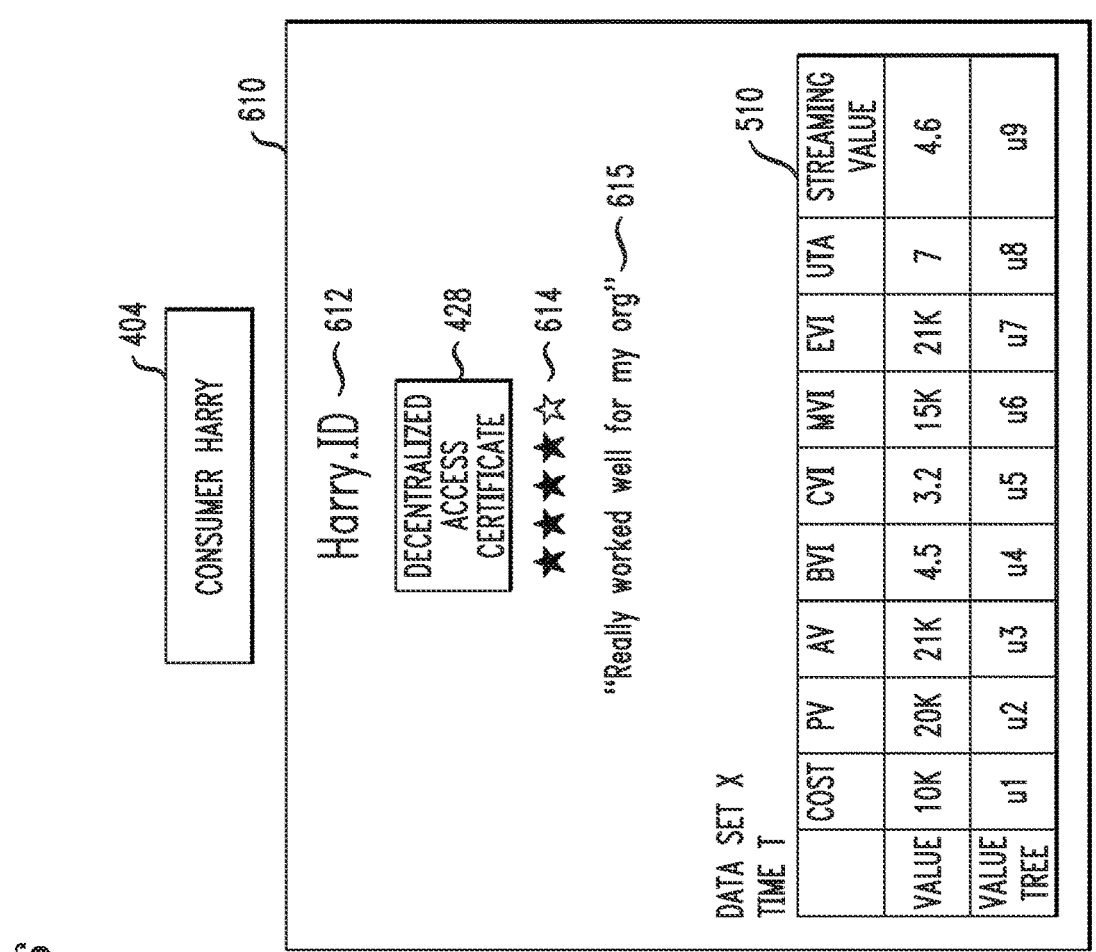
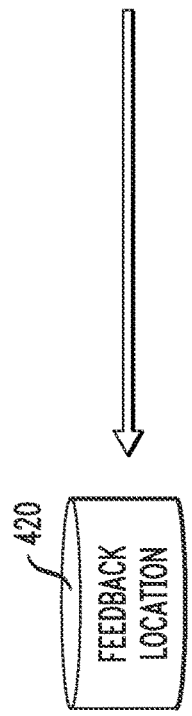
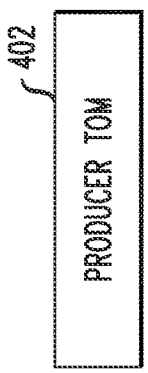
FIG. 6

800

VALUE-BASED DATA REPUTATION MANAGEMENT IN DATA MARKETPLACE ENVIRONMENT

FIELD

The field relates generally to information processing systems and, more particularly, to techniques for value-based data reputation management in a data marketplace environment.

BACKGROUND

A data marketplace is a computing platform on which data producers sell their data to data consumers. There is an ever-growing number of public data marketplaces in which data consumers (buyers) and data producers (sellers) can interact including, but not limited to, DEX, Datastreamx, ESRI, and LexisNexis. Data producers and data consumers interact with the data marketplace via respective client computing devices (clients) operatively coupled to the computing platform hosting the data marketplace. One or more such public data marketplaces are considered a data marketplace environment.

Two foundational pieces of information that allow buyers in a data marketplace to make decisions about purchasing a given data set include basic metadata about the given data set (i.e., content, size, creation date), and the price of the given data set (i.e., how much is the data owner requesting for purchase of the data). While these pieces of information are typically considered the minimal amounts of information to consider in a data purchase, there is still a significant amount of risk that comes with a decision to purchase that is solely based on such superficial information.

SUMMARY

Embodiments of the invention provide techniques for value-based data reputation management in a data marketplace environment.

For example, in one illustrative embodiment, a method comprises the following steps. In a data marketplace environment with at least one data producer and at least one data consumer, an electronic data storage area is established, by one of the data producer and the data consumer, for receiving and storing feedback data from the other of the data producer and the data consumer. The feedback data relates to a transaction between the data producer and the data consumer with respect to a given data set. In one or more illustrative embodiments, the feedback data comprises value-based feedback data, and reputations for the data producer and/or the data consumer can be determined based on the feedback data.

These and other features and advantages of the invention will become more readily apparent from the accompanying drawings and the following detailed description.

BRIEF DESCRIPTION OF THE DRAWINGS

FIG. 6 illustrates a process of a data consumer leaving post-purchase data feedback in a data marketplace environment according to an illustrative embodiment.

DETAILED DESCRIPTION

Figure 1:
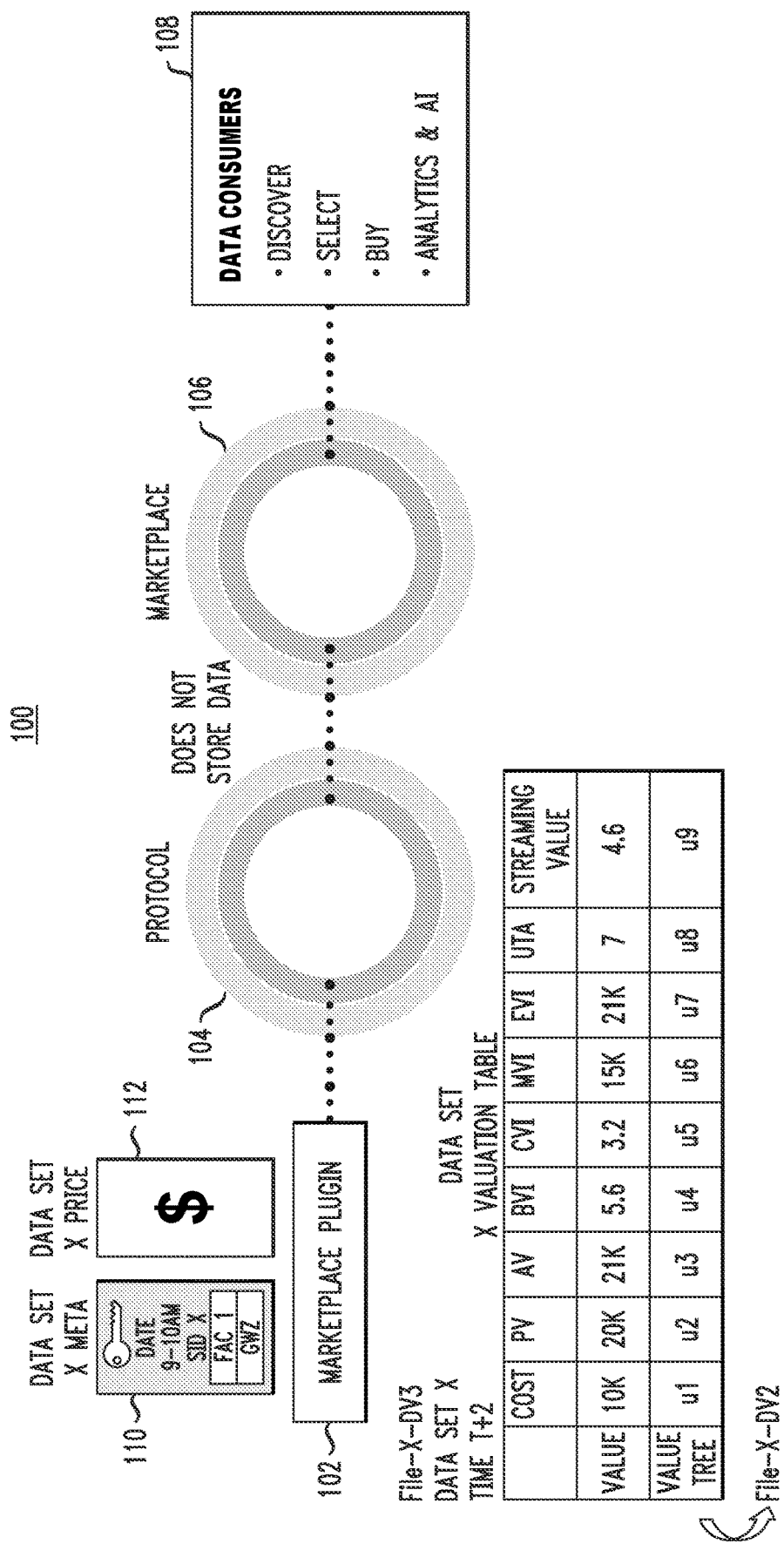
FIG. 1 illustrates a data marketplace environment using a valuation table to prove the value of a data set according to an illustrative embodiment.

Illustrative embodiments may be described herein with reference to exemplary cloud infrastructure, data repositories, data centers, data processing systems, computing systems, information processing systems, data storage systems and associated servers, computers, storage units and devices and other processing devices. It is to be appreciated, however, that embodiments of the invention are not restricted to use with the particular illustrative system and device configurations shown. Moreover, phrases such as "cloud infrastructure," "data repository," "data center," "data processing system," "computing system," "data storage system," "information processing system" and the like may be used herein and are intended to be broadly construed so as to encompass, for example, cloud computing or storage systems, as well as other types of systems comprising distributed virtual infrastructure and/or decentralized computing systems.

For example, some embodiments comprise a cloud infrastructure hosting multiple tenants that share cloud computing resources. Such systems are considered examples of what are more generally referred to herein as cloud computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system.

On the other hand, cloud infrastructures that are used by multiple enterprises, and not necessarily controlled or managed by any of the multiple enterprises but rather are respectively controlled and managed by third-party cloud providers, are typically considered "public clouds." Thus, enterprises can choose to host their applications or services on private clouds, public clouds, and/or a combination of private and public clouds (hybrid clouds) with a vast array of computing resources attached to or otherwise a part of information technology (IT) infrastructure. However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, an end user device or an application program of a computing system or some other form of computing platform;

"data" as utilized herein is intended to be broadly construed so as to encompass, for example, electronic or digital data;

"metadata" as utilized herein is intended to be broadly construed so as to encompass, for example, data that describes other data, i.e., data about other data; and "leveraging" or "leverage" as utilized herein is intended to be broadly construed so as to encompass, for example, utilization of data to obtain one or more benefits. For example, data of an enterprise can be monetized in a data marketplace environment whereby an enterprise obtains cryptocurrency in return for its data. However, an enterprise can leverage its data to receive in return one or more benefits other than cryptocurrency, e.g., allocation and use of computing resources that benefit the operational performance of an enterprise's IT and/or operational technology (OT) infrastructure (e.g., compute, storage and/or network capacities). Data can also be leveraged in exchange for other data. In some cases, data can be leveraged by donating the data and receiving a taxation benefit or simply good will.

As mentioned above, a purchase of data based solely on a minimal amount of information, including price and basic identifying metadata (i.e., content, size, creation date), carries many risks. Reliance on such a superficial (or surface) view of the content often results in problems that are only discovered after purchase. A solution has been proposed to provide proof-of-value provenance during a potential data transaction in a data marketplace environment. This solution is described in U.S. Ser. No. 16/263,065, filed on Jan. 31, 2019, and entitled "Proof-Of-Value Provenance for Data Marketplace Environment," the disclosure of which is incorporated by reference herein in its entirety.

In illustrative embodiments, proof-of-value provenance is provided by generating and maintaining a data structure in the form of a value tree. A value tree, as illustratively described herein, is considered an example of a proof-of-value provenance graph. While various forms of valuation data structures can be used to provide provenance in various illustrative embodiments, one example of a data value structure and methodology that can be used and/or adapted is described in U.S. Ser. No. 15/135,817, filed on Apr. 22, 2016 and entitled "Data Value Structures," the disclosure of which is incorporated by reference herein in its entirety.

In one or more illustrative embodiments, as each value tree is stored in a data value catalog, it is assigned a unique value that is calculated based on a cryptographic hash of the content. The cryptographic hash calculation can be done in a variety of ways including, in one embodiment, storing the value trees in an object-addressable storage system. Further, in a value tree catalog implementation, unique hash values are calculated for the different value trees stored for a given piece of content. The hash value calculation can be performed in any suitable conventional manner so long as a unique reference is generated for each value tree. In one or more illustrative embodiments, one or more valuation tables are generated with value tree references. It is to be appreciated that a valuation table keeps track of content values at any given point in time. One or more such valuation tables are then used as proof-of-value provenance for a given data set advertised for sale in a data marketplace environment.

FIG. 1 illustrates a process 100 of advertising a valuation table in a data marketplace environment according to an illustrative embodiment. Assume a data producer (not expressly shown) has access to a given marketplace plugin module 102 (via a client device), which is an interface that allows a data producer to access a given data marketplace platform. In one example, assume that protocol 104 is the Ocean protocol and marketplace 106 is the DEX data marketplace. The Ocean Protocol (available from Ocean Protocol Foundation Ltd., Singapore) is a decentralized data exchange protocol that can match data producers to data consumers 108 (e.g., one or more individuals via client devices, computing systems, corporate artificial intelligence (AI) algorithms willing to pay for certain types of data, etc.). As shown, further assume that marketplace plugin 102 is used to advertise Data Set X. In addition to minimal information about the data set (as mentioned above) such as bsic identifying metadata 110 (e.g., content, size, creation date) and a price 112 of the data (e.g., how much the data owner is selling the data set for), the latest version of a valuation table 114 is also shared.

More particularly, valuation table 114 is generated for a Data Set X at a Time T. Valuation table 114 contains multiple valuation scores (in first row of table) and references (using hash values u1-u9 in second row of table) value trees that contain the historical proof of how each valuation score was calculated. By way of example only, valuation table 114 shows nine different valuation scores that have been calculated for Data Set X at time T. For example, the acquisition cost (COST) of Data Set X was 10,000 dollars. The proof of this value is referenced by unique address (hash value) u1. The business value of the information (BVI) was measured to be 5.6 at time T, and the proof-of-value calculation was recorded in the value tree referenced by unique address (hash value) u4. Note that each unique address respectively points to proof of the corresponding value.

For example, at least some of the hash values point to value trees which can be generated from traditional analytic value flow in which source data sets are transformed into intermediate sets and ultimately into an end-user file. However, as mentioned above, there may be examples where data sets are not transformed but are exchanged and/or purchased. In such embodiments, valuation table 114 contains a reference to a tree or other data structure that stores a receipt (e.g., points to a blockchain transaction in which one party exchanged cryptocurrency with another party for a COST of $10,000). This receipt serves as a proof-of-value that the cost was indeed paid to acquire the file.

Another type of value tree that is not strictly transformational (e.g., created as a result of an analytic algorithm) is a data object that undergoes a value change based on enrichment and/or editing operations, e.g., cleaning, upgrading, replacing, or adding to a data set in order to improve overall data quality (however, in some embodiments, enriching data can be part of an analytic process). In the data enrichment case, the value tree contains nodes that represent the same data entity, with arcs that represent the type of enrichment that occurred (e.g., cleaning).

As data processing and improvement results in the ingest of new data sets (e.g., via purchase), modification and enrichment of data sets, and the creation of new data sets via analytics, periodic valuation continually occurs as well. As such, in illustrative embodiments, as valuation tables are generated and/or updated, these valuation tables are also stored and themselves assigned unique hash values (e.g., "File-X-DV1," "File-X-DV2," "File-X-DV3," etc.) that reference each other with back pointers (as referenced in FIG. 1 for table 114).

Accordingly, using techniques described above, data sets can now be advertised for sale with a rich set of provenance information that proves that the asking price for the data set is reasonable. However, the fact that a data producer is providing a proof-of-value does not necessarily guarantee that the data consumer will realize the value advertised by the data producer.

It is realized herein that it would be desirable for a data producer to also provide data reputation indicia. Such indicia would provide an additional level of assurance that the advertised data is coming from a data producer with a history of providing high-value data sets.

It is further realized herein that data reputation indicia could also be assigned to data consumers. If a data consumer is found to have used purchased data inappropriately, that behavior should be noted in their online data reputation.

Illustrative embodiments provide the above and other value-based data reputation functionalities.

Figure 2:
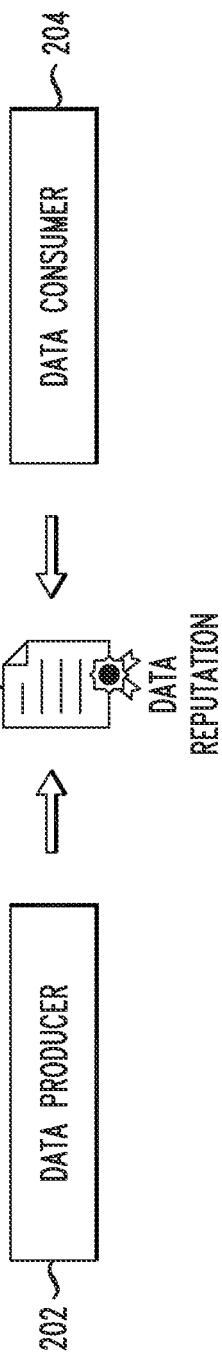
FIG. 2 illustrates a data marketplace environment with data reputation indicia added to a data transaction according to an illustrative embodiment.

FIG. 2 highlights the desired end state, i.e., data producers and data consumers can include data reputation indicia as part of their negotiation. More particularly, FIG. 2 shows a process 200 with a data producer 202 providing information including metadata 206, price 208, and valuation table 210 about the sale of Data Set X to a data marketplace environment including at least data consumer 204. In addition, as will be described in accordance with illustrative embodiments, data reputation indicia 212 (one or more objects, tokens, scores, ranks, certificates, or other indicators) is exchanged or otherwise made available between the data producer 202 and the data consumer 204.

Such data reputation functionalities are currently not implemented in data market environments. It is realized that implementing data reputation functionalities is problematic in current data marketplace environments for a number of reasons. A description of some main reasons is provided below.

There is currently no feedback mechanism (such as, for example, an application programming interface (API)) for a data consumer to rate or rank a data transaction. For example, if the data producer 202 in FIG. 2 advertises a price 208 for Data Set X, and also provides a valuation table 210 for Data Set X as evidence of the price, there is no existing way for a data consumer 204 to programmatically provide feedback to the data producer 202 as to whether or not Data Set X actually did provide substantial value to the data consumer 204.

Further, if a data consumer were to provide programmatic feedback on the value of the purchased data, there is currently no mechanism to evaluate whether or not the data consumer's feedback on the value of the data is fair or unfair.

When a data consumer is considering the reputation of a data producer, they are likely doing so to bring greater returns to their own business. When exploring the data reputation of a data producer, it is realized herein that data consumers would benefit from more than a "thumbs up/thumbs down" type rating. They would also appreciate more than a scale ranking (e.g., "4" on a scale from 1 to 5). However, there is currently no ability to rank a data seller based on the actual historical "returns" (i.e., actual received business benefit in comparison to price paid to the data producer).

Still further, there is no existing mechanism for a data producer to provide feedback on a data consumer. For example, a data consumer may buy a data set and agree to non-distribution and/or non-disclosure of the data outside of their corporation. If the data consumer is found to have violated that agreement, there is no recourse for a data producer to flag that violation in a data marketplace environment as a warning to future data producers. Also, a data consumer should have recourse to explain or otherwise protest unfair data producer feedback.

It is also realized herein that a data consumer may purchase a data set and measure its value using radically different techniques than were used by a data producer. There is currently no way to account for such differences as part of leaving data reputation feedback.

Similarly, a data producer may use a plurality of techniques to calculate the sale price of a piece of data, but those techniques may be irrelevant to a data consumer. This discrepancy should be taken into account when calculating data reputation.

It is further realized herein that a data consumer with a good reputation should be rewarded (e.g., data discounting based on reputation). This type of incentive is currently not possible in existing data marketplace environments.

Illustrative embodiments overcome the above and other drawbacks with data marketplace environments by providing value-based data reputation functionalities as will be further explained below in the context of FIGS. 3-10.

Figure 3:
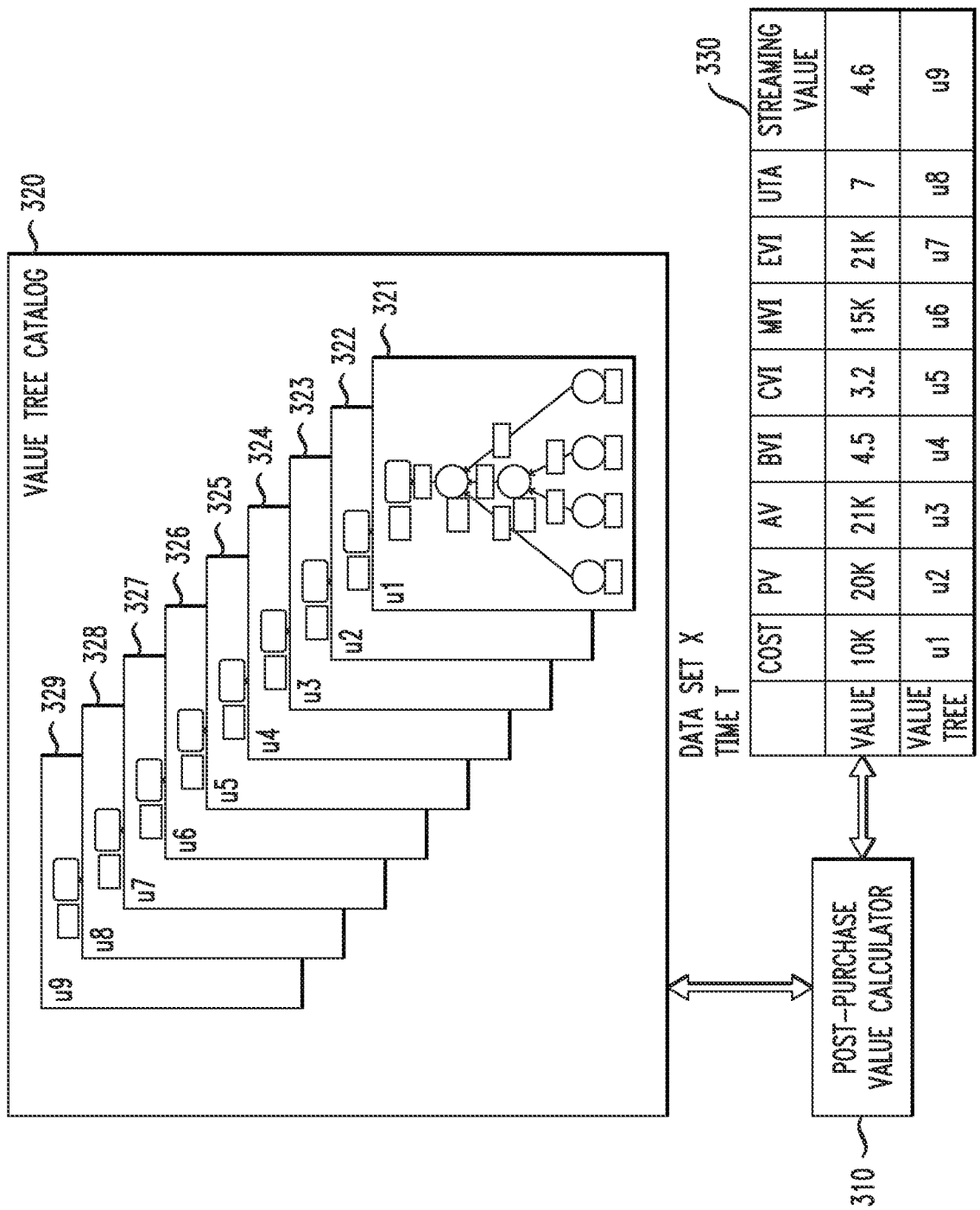
FIG. 3 illustrates a post-purchase value calculator for a data consumer in a data marketplace environment according to an illustrative embodiment.

FIG. 3 illustrates a post-purchase value calculator for a data consumer in a data marketplace environment according to an illustrative embodiment. In this illustrative embodiment, it is assumed that data consumer feedback is provided in the form of valuation graphs that measure the value experienced by the data consumer, from the data, post-purchase. That is, FIG. 3 depicts a process 300 for recording value creation by the data consumer.

Note that while the terms "data producer" and "data consumer" are used throughout the descriptions herein, a data producer can also be referred to as a data seller, data owner or the like, while a data consumer can also be referred to as a data purchaser or the like.

More particularly, as shown, a post-purchase value calculator 310 creates a value tree catalog 320 of data value graphs 321 through 329, e.g., data value structures described in the above-referenced U.S. Ser. No. 15/135,817 and U.S. Ser. No. 16/263,065 applications. Each data value graph 321 through 329 has its own unique reference, i.e., u1 through u9, respectively. The value tree catalog 320 represents multiple measurements of the value of Data Set X which was purchased at some previous time (time T-delta). In addition, post-purchase value calculator 310 generates a valuation table 330 from the data value graphs 321-329 in value tree catalog 320.

Assume that the data purchaser actively used Data Set X in their corporation. Assume further that as they were doing so, they actively measured value, and each value in the valuation table 330 (e.g., Cost, BVI, CVI) references a valuation graph (u1-u9) that contains an immutable record of how that particular value was calculated at time T. This valuation process 300 is similar to the technique used by a data producer to calculate the value of data.

Given the above-described illustrative valuation process, data reputation for both the data consumer and the data producer is generated as will be further explained below.

Figure 4:
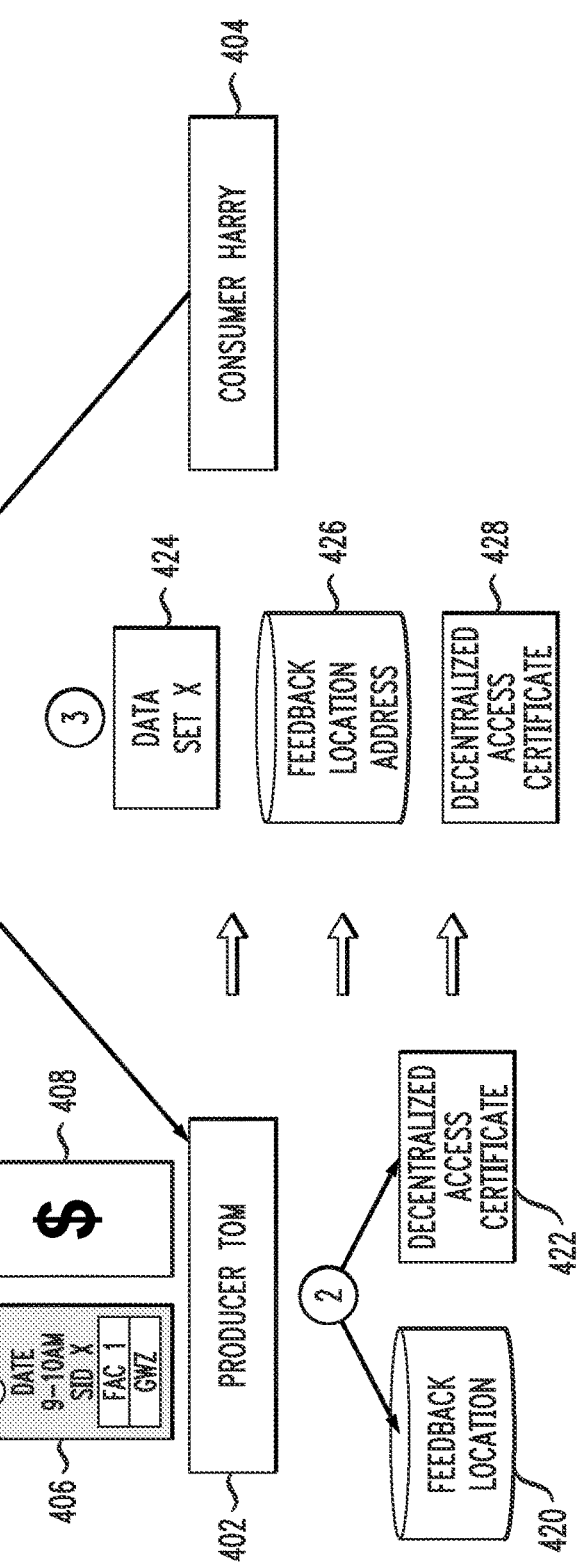
FIG. 4 illustrates a process of creation of a feedback location and a certificate to access the location in a data marketplace environment according to an illustrative embodiment.

FIG. 4 illustrates a process 400 of creation of a feedback location and a certificate to access the location in a data marketplace environment according to an illustrative embodiment.

As shown, data producer (Tom) 402 and data consumer (Harry) 404 engage in a data marketplace environment transaction for Data Set X (using their respective client devices). Data producer 402 advertises meta data 406, price 408, and valuation table 410 relating to Data Set X. Assuming data consumer 404 agrees to purchase Data Set X, cryptocurrency 412 is transferred from data consumer 404 to data producer 402. In this illustrative embodiment, the transaction is controlled through a smart contract 414 executed between the two parties. The smart contract 414 also specifies a storage location where data consumer 404 can leave feedback. Part of the actual smart contract 414 may specify that the data producer must create such a location.

More particularly, assume in step 1 in FIG. 4, data consumer 404 agrees to a smart contract 414 and as a result cryptocurrency 412 is transferred from an electronic wallet associated with data consumer 404. In some illustrative embodiments, assume that data consumer 404 established a public identity (e.g., "Harry.ID") that is associated with its electronic wallet. Further assume that data producer 402 likewise has established a public identity (e.g., "Tom.ID") that allows it to receive payment in its own electronic wallet.

In one or more illustrative embodiments, identities "Harry.ID" and "Tom.ID" are respectively associated with private keys and their profiles can be inspected using open-source tools such as, by way of example only, Blockstack. Blockstack is a decentralized identity management system described in M. Ali et al., "Blockstack: A Global Naming and Storage System Secured by Blockchains," Proceedings of the 2016 USENIX Annual Technical Conference, p. 181-194, June 2016, the disclosure of which is incorporated by reference herein in its entirety. In general, Blockstack uses a blockchain (distributed ledger) to bind a digital property, such as a name, to a given value. Immutability and therefore trust are provided in a decentralized manner by allowing for any new node in the system to independently verify data bindings through the blockchain.

As part of the smart contract 414, as depicted in step 2 in FIG. 4, data producer 402 allocates an electronic data storage area ("storage area") as a feedback location 420 where data consumer 404 can leave feedback about the transaction. In addition, data producer 402 creates a decentralized access certificate 422 in which it gives "Harry.ID" permission to write feedback to the feedback location 420. The certificate 422 may be referred to as an access permission object. It is to be understood that the storage area for the feedback location 420 corresponding to data producer 402 can be collocated with the data producer in some embodiments, remotely located in other embodiments, or a combination thereof in yet further embodiments. Likewise, as will be explained below, a storage area for a feedback location corresponding to data consumer 404 can be collocated with the data consumer in some embodiments, remotely located in other embodiments, or a combination thereof in yet further embodiments.

In step 3 of FIG. 4, data producer 402 sends the purchased data 424, feedback location address 426, and a copy of the decentralized access certificate 428 to data consumer 404. In alternative embodiments, the originally created certificate 422 (rather than a copy 428) can be sent or a pointer object pointing to a location where the certificate can be obtained can be sent. Note that, in one illustrative embodiment, a time-window is set for how long the data consumer 404 has to leave feedback (e.g., credential expiration after one month from purchase).

While, in the FIG. 4 embodiment, the address 426 (storage address or other form of locator) of the feedback location 420 is sent from data producer 402 to data consumer 404, in alternative embodiments, the address 426 is not sent from data producer 402 to data consumer 404. For example, in some embodiments, the electronic data storage area is well known or not known at all, e.g., the connection over which the data producer 402 and data consumer 404 are communicating with each other, or a port that an identity is commonly known to listen to. That is, in one or more embodiments, the data consumer 404, without knowing the storage location, can just send its feedback or provide an indication that what is being sent (sent with the indication or contemporaneous to the sending of the indication) is its feedback.

Figure 5:
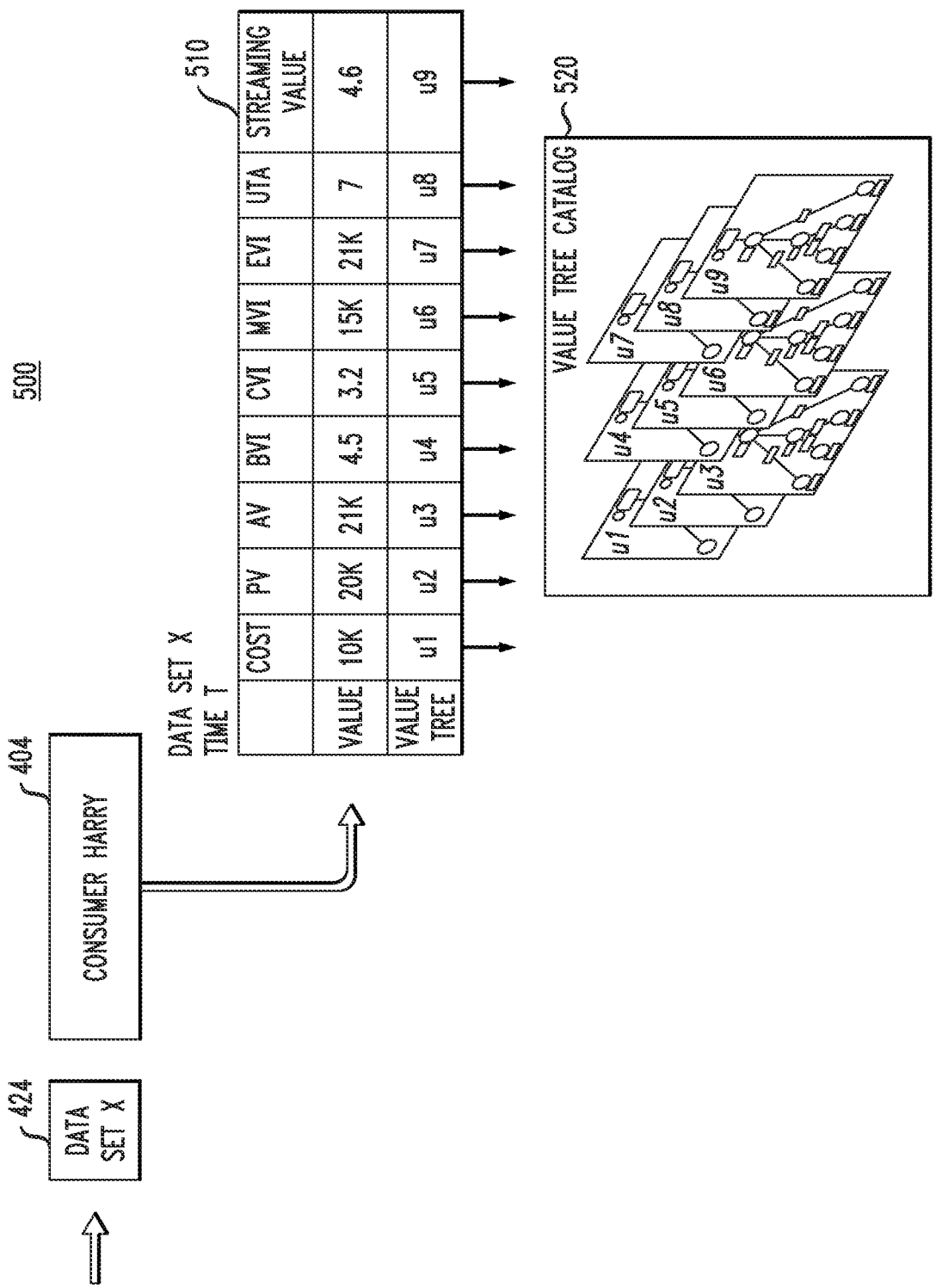
FIG. 5 illustrates a process of a data consumer receiving data and producing value in a data marketplace environment according to an illustrative embodiment.

FIG. 5 illustrates a process 500 of data consumer 404 receiving data and producing value according to an illustrative embodiment. Once the data set 424 has been purchased and received, data consumer 404 begins to leverage Data Set X in order to generate business results. During this process, data consumer 404 begins to calculate his own valuation table 510 and supporting graphs in a value catalog 520 at time T. Recall that this post-purchase value calculation process is also depicted and described above in the context of FIG. 3.

Once data consumer 404 has realized some sort of value (positive or negative) from the use of the purchased data set, the data consumer 404 leaves feedback at the feedback location 420 identified by data producer 402. In some illustrative embodiments, feedback occurs in one of two forms: (i) subjective rankings, such as "likes," "thumbs up/down," 1-5 stars, and/or free-text comments as to their experience; and (ii) objective rankings in the form of provable statements (e.g., valuation table 510).

FIG. 6 illustrates a process 600 of data consumer 404 leaving post-purchase data feedback in feedback location 420 for data producer 402 according to an illustrative embodiment. More particularly, FIG. 6 illustrates an illustrative embodiment of such feedback depicted as data object 610. In this embodiment, data object 610 comprises the decentralized identity 612 ("Harry.ID") of data consumer 404, the copy of the decentralized access certificate 428 that was received from data producer 402, subjective ranking type feedback 614 (4 out of 5 stars awarded by data consumer 404) and 615 (free-text comments, e.g., "Really worked well for my org"), and objective rankings such as valuation table 510. Recall that inclusion of the certificate 428 in the feedback object is used to demonstrate receipt of permission to write to feedback location 420 of data producer 402. Data object 610 is then sent by data consumer 404 to feedback location 420 where the data object 610 is stored.

In the embodiment described above, data producer 402 receives 4 out of 5 stars and positive comments from data consumer 404. However, in accordance with one or more illustrative embodiments, if the feedback was negative or arguably should have been better in the opinion of the data producer, data producer 402 is able to challenge the feedback using a challenge-response approach.

Figure 7:
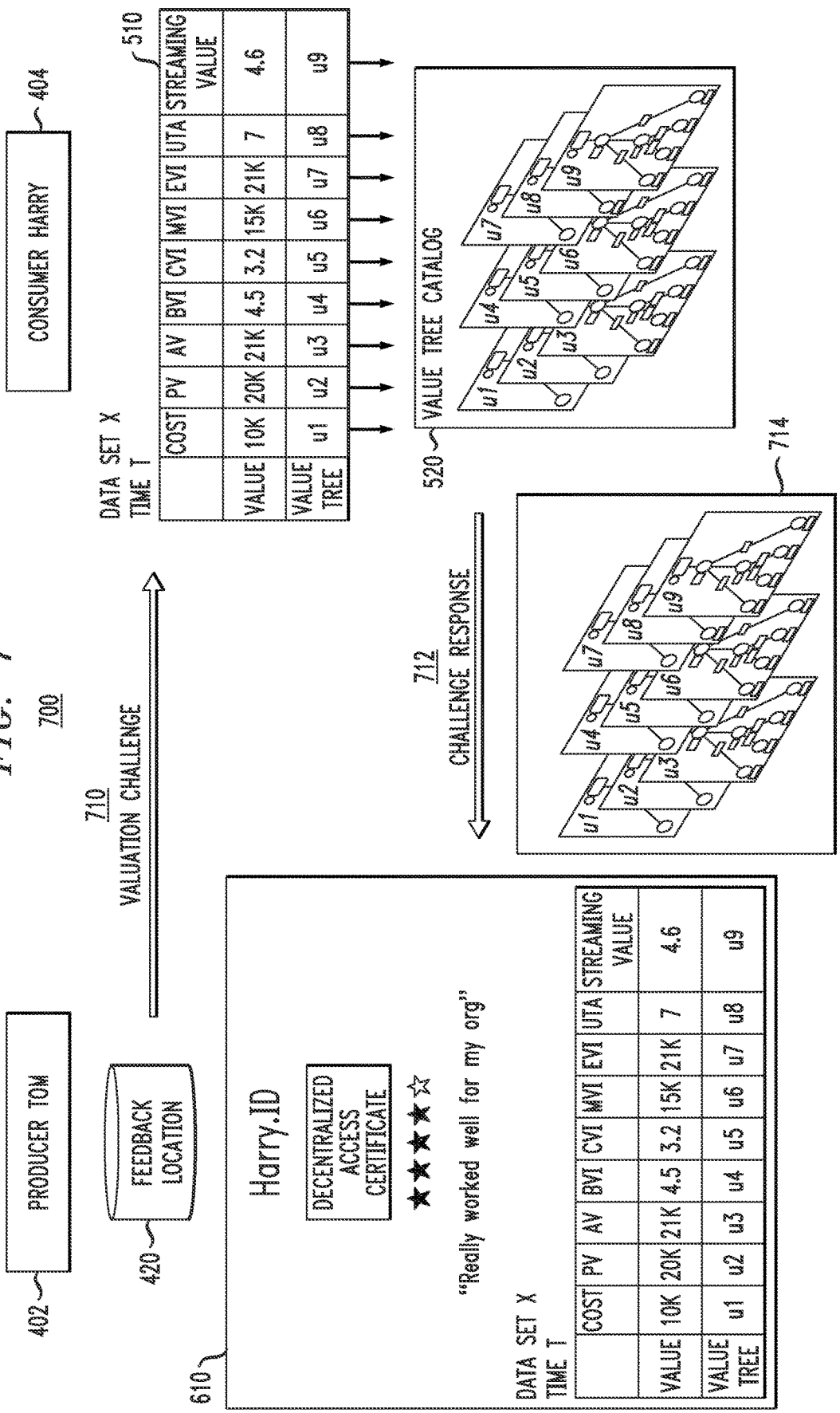
FIG. 7 illustrates a process of a data producer challenging data consumer feedback and a data consumer response in a data marketplace environment according to an illustrative embodiment.

FIG. 7 illustrates a process 700 of data producer 402 challenging feedback (data object 610) written to feedback location 420 by data consumer 404, and data consumer 404 providing a response according to an illustrative embodiment. As shown in FIG. 7, data producer 402 sends a valuation challenge message 710 to data consumer 404, followed by data consumer 404 sending a challenge response message 712 to data producer 402.

For objective valuation table feedback, data producer 402 would have the right to openly challenge the creation of the valuation tables. In some embodiments, this results in data consumer 404 delivering one or more specific valuation graphs 714 from the value tree catalog 520 (generated by post-purchase calculator along with valuation table 510) as evidence of a poor data purchase experience. Note that if data consumer 404 does not respond to the challenge with evidence of poor internal data performance, data producer 402 is given the right to remove, delete, or otherwise discard part or all of data object 610 in feedback location 420 as invalid.

It is to be appreciated that the above-described feedback techniques are applicable in a straightforward manner in additional or alternative embodiments where data producer 402 wishes to leave feedback about data consumer 404 with respect to the transaction.

Recall above that there could be a case where data consumer 404 uses data purchased from data producer 402 in violation of an agreed upon usage. Data producer 402 is therefore able to leave feedback about this violation in a data consumer feedback location established similar to the data producer feedback location established as described above in the context of FIG. 4. Similarly, in illustrative embodiments, a decentralized access certificate is generated by data consumer 404, obtained by data producer 402 along with the address of the data consumer feedback location, and then presented by data producer 402 when sending the feedback (data object with data producer's decentralized identity and feedback) to the data consumer feedback location. This feedback may be largely subjective.

With feedback being generated for purchased data, a data producer eventually builds up a catalog of feedback from data consumers. The subjective data (number of stars, comments) can be summarized using conventional statistical techniques. The use of valuation tables, however, allows for programmatic calculation of reputation, including provable descriptions of "data returns" over time. This scenario is highlighted in FIG. 8.

Figure 8:
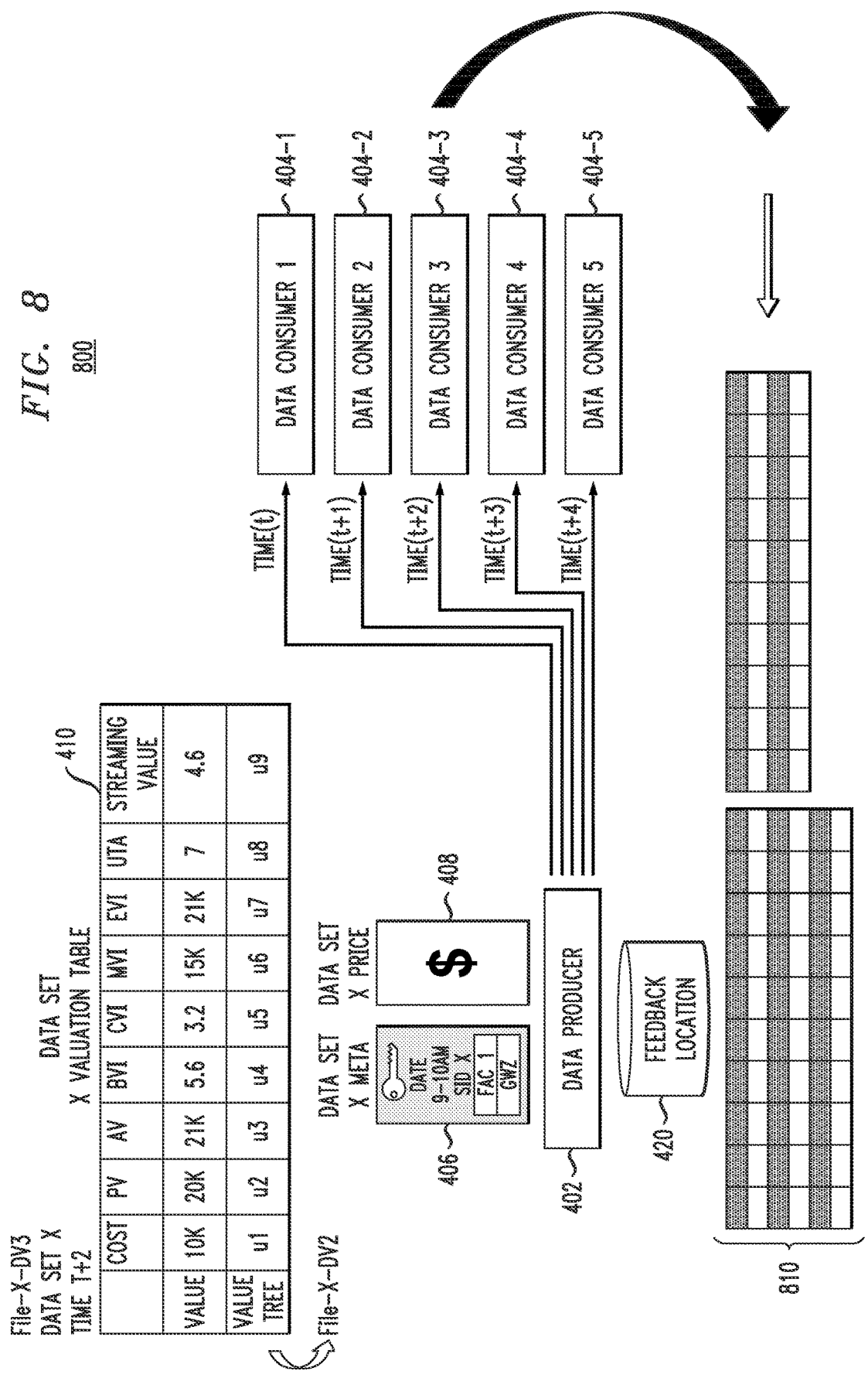
FIG. 8 illustrates a process of accumulation of consumer feedback from multiple data consumers in a data marketplace environment according to an illustrative embodiment.

FIG. 8 illustrates a process 800 of accumulation of consumer feedback from multiple data consumers according to an illustrative embodiment. More particularly, FIG. 8 highlights five data consumers 404-1 through 404-5 who purchased Data Set X (originally advertised by meta data 406, price 408, and valuation table 410 as described above) from data producer 402 at various points in time, respectively, Time(t) through Time(t+4). Assume that data consumers 404-1 through 404-5 all consume the data and produce feedback in the form of five different valuation tables, collectively depicted as 810 at feedback location 420 in FIG. 8. This allows an entity (e.g., the data producer and/or a third party) to look at the "returns" (e.g., an increase or decrease in business value) based on the originally advertised "Data Set X valuation table 410.

Figure 9:
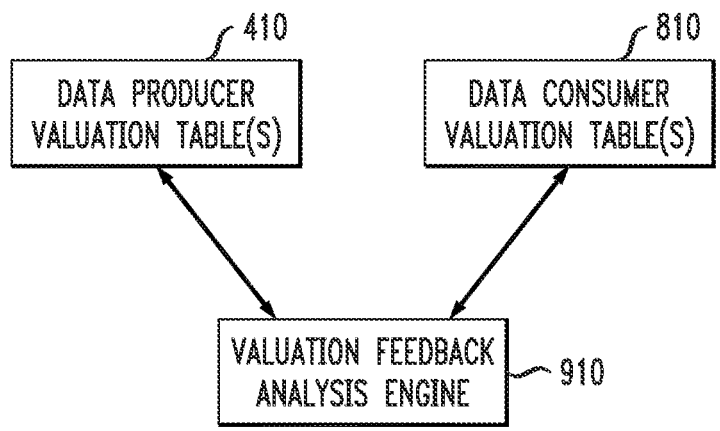
FIG. 9 illustrates a process of valuation feedback analysis in a data marketplace environment according to an illustrative embodiment.

FIG. 9 illustrates a process 900 of valuation feedback analysis in a data marketplace environment according to an illustrative embodiment. More particularly, as shown, one or more data producer valuation tables 410 (and/or other feedback) and one or more data consumer valuation tables 810 (and/or other feedback) are provided, or otherwise made accessible at their respective feedback locations, to a valuation feedback analysis engine 910 that comprises one or more algorithms configured to analyze the valuation tables and/or other feedback and generate analysis results.

For example, in one or more illustrative embodiments, one or more algorithms are provided as part of engine 910 that are configured to analyze at least a portion of the feedback and generate claims such as, by way of example only, "the data from this data producer on average produces a 5% return on business value post-purchase." These claims can be backed up by inspecting the valuation tables in the feedback location(s).

Furthermore, in one or more illustrative embodiments, engine 910 is configured to execute a class of algorithms that take into account every valuation table generated by the data producer and iterating over every subsequent, valid valuation result experienced by data consumers. In some embodiments, these algorithms are applied across data producers and normalized to determine which data producer has the "best reputation." Best reputation, in illustrative embodiments, is based on a determination by engine 910 that data from such data producer yields the highest value for one or more data consumers.

Still further, in some illustrative embodiments, engine 910 enables data producers to keep track of which data consumers are leaving feedback and build "data discounts" into subsequent purchases with data consumers who have good (or frequent) feedback ratings.

It is to be appreciated that engine 910 can be located within the data marketplace environment, and in various embodiments can be implemented as one centralized module or multiple decentralized modules accessible by data producers and data consumers. Alternative implementations of engine 910, as well as other data marketplace components, are contemplated herein.

Figure 10:
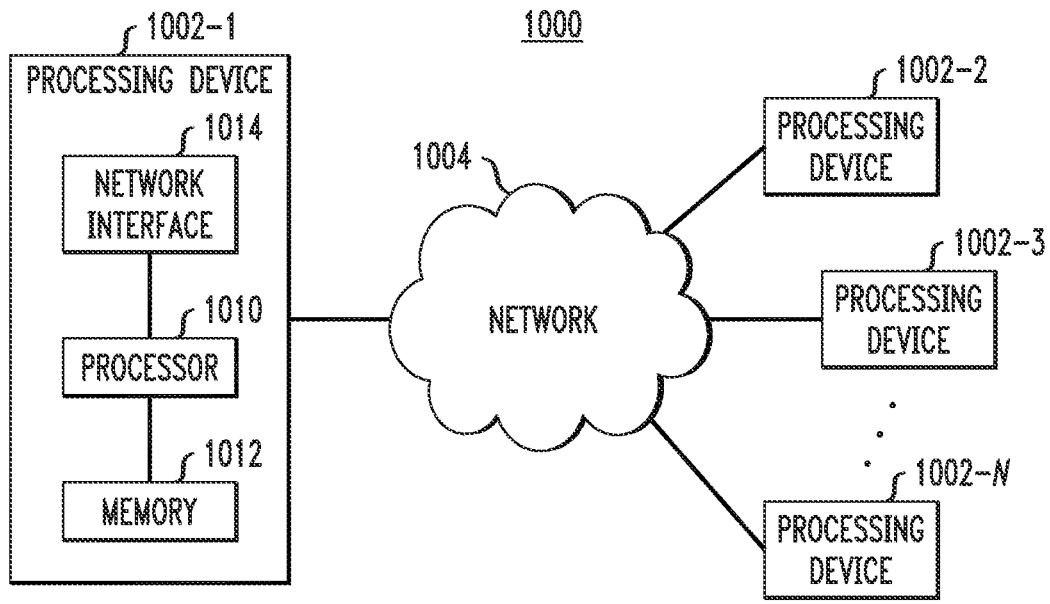
FIG. 10 illustrates a processing platform used to implement a value-based data reputation management methodology in a data marketplace environment according to an illustrative embodiment.

An example of a processing platform on which a value-based data reputation management methodology and a data marketplace environment (as shown in FIGS. 1-9) according to illustrative embodiments can be implemented is processing platform 1000 shown in FIG. 10. The processing platform 1000 in this embodiment comprises a plurality of processing devices, denoted 1002-1, 1002-2, 1002-3, . . . 1002-N, which communicate with one another over a network 1004. It is to be appreciated that methodologies described herein may be executed in one such processing device 1002, or executed in a distributed manner across two or more such processing devices 1002. Thus, the framework environment may be executed in a distributed manner across two or more such processing devices 1002. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 10, such a device comprises at least one processor and an associated memory, and implements one or more functional modules for instantiating and/or controlling features of systems and methodologies described herein. Multiple elements or modules may be implemented by a single processing device in a given embodiment.

The processing device 1002-1 in the processing platform 1000 comprises a processor 1010 coupled to a memory 1012. The processor 1010 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 1010. Memory 1012 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 1012 may comprise electronic memory such as random access memory (RAM), read-only memory (ROM) or other types of memory, in any combination. The one or more software programs when executed by a processing device, such as the processing device 1002-1, causes the device to perform functions associated with one or more of the components/steps of system/methodologies in FIGS. 1-9. One skilled in the art would be readily able to implement such software given the teachings provided herein. Other examples of processor-readable storage media embodying embodiments of the invention may include, for example, optical or magnetic disks.

Processing device 1002-1 also includes network interface circuitry 1014, which is used to interface the device with the network 1004 and other system components. Such circuitry may comprise conventional transceivers of a type well known in the art.

The other processing devices 1002 (1002-2, 1002-3, . . . 1002-N) of the processing platform 1000 are assumed to be configured in a manner similar to that shown for processing device 1002-1 in the figure.

The processing platform 1000 shown in FIG. 10 may comprise additional known components such as batch processing systems, parallel processing systems, physical machines, virtual machines, virtual switches, storage volumes, etc. Again, the particular processing platform shown in this figure is presented by way of example only, and systems described herein may include additional or alternative processing platforms, as well as numerous distinct processing platforms in any combination.

Also, numerous other arrangements of servers, clients, computers, storage devices or other components are possible in processing platform 1000. Such components can communicate with other elements of the processing platform 1000 over any type of network, such as a wide area network (WAN), a local area network (LAN), a satellite network, a telephone or cable network, or various portions or combinations of these and other types of networks.

Furthermore, it is to be appreciated that the processing platform 1000 of FIG. 10 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 1000 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It is to be noted that portions of the value-based data reputation management methodology for a data marketplace environment described herein may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   in a data marketplace environment with at least one data producer and at least one data consumer, wherein the data marketplace environment is implemented on a processing platform;
   allocating, by a given one of the data producer and the data consumer, an electronic data storage area for receiving and storing feedback data from the other one of the data producer and the data consumer, wherein the feedback data relates to a transaction between the given one of the data producer and the data consumer and the other one of the data producer and the data consumer with respect to a given data set; and
   generating, by the given one of the data producer and the data consumer, an access permission object to permit selective access to the electronic storage area to the other one of the data producer and the data consumer, the access permission object comprising a public identity associated with an electronic wallet of the other one of the data producer and the data consumer, the public identity being bound to a given value stored in one or more blocks of a blockchain distributed ledger;

receiving, at the electronic storage area, feedback data from the other one of the data producer and the data consumer, the feedback data comprising a subjective ranking of the given one of the data producer and the data consumer and an objective ranking of the given one of the data producer and the data consumer, the objective ranking comprising a valuation table comprising two or more valuation scores for the given data set, each of the two or more valuation scores referencing one or more valuation graphs in a value tree catalog measuring a value of the given data set experienced by the other one of the data producer and the data consumer, each of the one or more valuation graphs comprising a record of how one of the two or more valuation scores was calculated at a given time; and wherein the steps are performed by at least one processing device comprising a processor and a memory, and wherein the processing device is operatively coupled to the processing platform that implements the data marketplace environment.

2. The method of claim 1, further comprising sending the given data set, with the access permission object, from the given one of the data producer and the data consumer to the other one of the data producer and the data consumer.

3. The method of claim 1, further comprising the given one of the data producer and the data consumer challenging the feedback data received from the other one of the data producer and the data consumer.

4. The method of claim 3, further comprising the given one of the data producer and the data consumer modifying or deleting at least a portion of the feedback data based on a result of the challenging step.

5. The method of claim 1, further comprising sending a location for the electronic data storage area from the given one of the data producer and the data consumer to the other one of the data producer and the data consumer.

6. The method of claim 1, further comprising setting a time limit to receive the feedback data from the other of the data producer and the data consumer.

7. The method of claim 1, wherein the feedback data from the other one of the data producer and the data consumer is aggregated with additional feedback data from one or more additional data producers or data consumers of the given data set in the data marketplace environment.

8. The method of claim 7, further comprising analyzing the aggregated feedback data to determine a reputation of the given one of the data producer and the data consumer.

9. The method of claim 1, wherein the reference to the one or more valuations graphs in the value tree catalog for a given one of the two or more valuation scores in the valuation table comprises a cryptographic hash of content of the one or more valuation graphs in the value tree catalog.

10. The method of claim 1, wherein the electronic storage area comprises a designated storage address.

11. The method of claim 1, wherein the electronic storage area comprises a connection over which the given one of the data producer and the data consumer and the other one of the data producer and the data consumer communicate.

12. The method of claim 1, wherein the electronic storage area comprises a designated port that the given one of the data producer and the data consumer listens to.

13. The method of claim 1, wherein the subjective ranking of the given one of the data producer and the data consumer comprises free-text comments associated with leveraging of the given data set by the other one of the data producer and the data consumer.

14. An article of manufacture comprising a processor-readable storage medium having encoded therein executable code of one or more software programs, wherein the one or more software programs when executed by the processing device implement the steps of claim 1.

15. A method comprising:

in a data marketplace environment with at least one data producer and at least one data consumer, wherein the data marketplace environment is implemented on a processing platform;

computing, by the data consumer, a valuation for a given data set obtained by the data consumer in a transaction with the data producer, the valuation comprising a subjective ranking of the data producer and an objective ranking of the data producer, the objective ranking comprising a valuation table comprising two or more valuation scores for the given data set, each of the two or more valuations scores referencing one or more valuation graphs in a value tree catalog measuring a value of the given data set experienced by the data consumer, each of the one or more valuation graphs comprising a record of how one of the two or more valuation scores was calculated at a given time;

receiving, from the data producer, an access permission object permitting access to an electronic data storage area allocated by the data producer for receiving and storing feedback data, the access permission object comprising a public identity associated with an electronic wallet of the data consumer, the public identity being bound to a given value stored in one or more blocks of a blockchain distributed ledger; and sending, from the data consumer, at least a portion of the computed valuation as part of the feedback data, along with at least a portion of the access permission object, to the electronic data storage area;

wherein the steps are performed by at least one processing device comprising a processor and a memory, and wherein the processing device is operatively coupled to the processing platform that implements the data marketplace environment.

16. The method of claim 15, further comprising sending with the feedback data, from the data consumer, the public identity of the data consumer.

17. The method of claim 15, further comprising the data consumer receiving a challenge of the feedback data from the data producer.

18. The method of claim 17, further comprising the data consumer responding to the challenge by sending at least one of the one or more valuation graphs in the value tree catalog that proves the computed valuation to the data producer.

19. The method of claim 15 wherein the step of sending is performed within a time limit set by the data producer.

20. An article of manufacture comprising a processor-readable storage medium having encoded therein executable code of one or more software programs, wherein the one or more software programs when executed by at the processing device implement the steps of claim 15.

* * * * *